United States Patent
Kim

(10) Patent No.: US 7,448,074 B2
(45) Date of Patent: Nov. 4, 2008

(54) METHOD FOR USING USER DATA IN A BLUETOOTH DEVICE WITHOUT USER INTERFACE

(75) Inventor: Su-Hwan Kim, Kyunggi-do (KR)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 775 days.

(21) Appl. No.: 10/146,690

(22) Filed: May 15, 2002

(65) Prior Publication Data

US 2003/0002678 A1    Jan. 2, 2003

(30) Foreign Application Priority Data

Jun. 29, 2001    (KR)    ................. 2001-38080

(51) Int. Cl.
  G06F 21/00    (2006.01)
  G06F 15/16    (2006.01)
  H04Q 7/20    (2006.01)

(52) U.S. Cl. ................. 726/5; 726/4; 713/168; 380/270; 455/436

(58) Field of Classification Search ................. 709/200
  See application file for complete search history.

(56) References Cited

U.S. PATENT DOCUMENTS

| | | | |
|---|---|---|---|
| 6,574,455 B2 * | 6/2003 | Jakobsson et al. ........... 455/41.2 |
| 6,622,018 B1 * | 9/2003 | Erekson ....................... 455/420 |
| 6,678,516 B2 * | 1/2004 | Nordman et al. .......... 455/414.1 |
| 6,834,192 B1 * | 12/2004 | Watanabe et al. ............ 455/444 |
| 6,912,373 B2 * | 6/2005 | Lee ............................. 455/41.2 |
| 6,968,153 B1 * | 11/2005 | Heinonen et al. ........... 455/11.1 |
| 7,016,325 B2 * | 3/2006 | Beasley et al. ............... 370/331 |
| 7,016,336 B2 * | 3/2006 | Sorensen .................... 370/351 |
| 7,193,991 B2 * | 3/2007 | Melpignano et al. ........ 370/352 |
| 2001/0030950 A1 * | 10/2001 | Chen et al. .................. 370/329 |
| 2001/0055951 A1 * | 12/2001 | Slotznick .................... 455/41 |
| 2002/0039424 A1 * | 4/2002 | Watanuki .................... 381/74 |
| 2002/0044661 A1 * | 4/2002 | Jakobsson et al. .......... 380/270 |
| 2002/0068600 A1 * | 6/2002 | Chihara et al. ............. 455/550 |
| 2002/0087224 A1 * | 7/2002 | Barile .......................... 700/94 |
| 2003/0035464 A1 * | 2/2003 | Dehner et al. .............. 375/132 |
| 2003/0036386 A1 * | 2/2003 | Harrison ..................... 455/438 |
| 2003/0046689 A1 * | 3/2003 | Gaos ........................... 725/34 |
| 2003/0174861 A1 * | 9/2003 | Levy et al. ................... 382/100 |
| 2004/0009750 A1 * | 1/2004 | Beros et al. ................. 455/41.2 |
| 2004/0014422 A1 * | 1/2004 | Kallio ......................... 455/41.1 |
| 2005/0170833 A1 * | 8/2005 | Izumi ........................ 455/435.1 |
| 2005/0286466 A1 * | 12/2005 | Tagg et al. .................. 370/329 |
| 2006/0135065 A1 * | 6/2006 | Lee at al. .................... 455/41.1 |

OTHER PUBLICATIONS

Baatz et al, "Handoff Support for Mobility with IP over Bluetooth", 2000, IEEE, p. 143-154.*

* cited by examiner

Primary Examiner—Christopher A Revak
(74) Attorney, Agent, or Firm—F. Chau & Associates, LLC

(57) ABSTRACT

A method of utilizing user data in a Bluetooth device without a user interface. In one aspect, a method of utilizing user data in a Bluetooth device comprises transmitting user data from a first Bluetooth device having a user interface to a second Bluetooth device having no user interface, and storing the user data in the second Bluetooth device, reading out the stored user data in response to an input of a predetermined shortcut key, and establishing communication with a Bluetooth device that corresponds to the read-out user data.

12 Claims, 5 Drawing Sheets

METHOD FOR USING USER DATA IN A BLUETOOTH DEVICE WITHOUT USER INTERFACE

CROSS-REFERENCE TO RELATED APPLICATION

This application claims priority to Korean Patent Application No. 2001-38080, filed on Jun. 29, 2001.

FIELD OF THE INVENTION

The present invention relates to a method of utilizing user data in a Bluetooth device without a user interface.

BACKGROUND OF THE INVENTION

Bluetooth is wireless communication protocol that allows a plurality of Bluetooth-enabled devices to communicate in a secure, ad-hoc fashion, by sharing user data. The shared data comprises, for example, personal identification number (PIN) codes, which are used by the Bluetooth security architecture for purposes of encryption and authentication to establish secure and trusted relationships between Bluetooth-enabled devices. More specifically, at a link layer, Bluetooth provides authentication, encryption, and key management of the various keys involved. Authentication involves the user providing a PIN that is translated into a 128-bit link key that can be authenticated in a one or two-way direction. Once devices are authenticated, the link can be encrypted at various key lengths. The link layer security framework provides various authentication schemes and a flexible encryption scheme that allows devices to negotiate for key length. Bluetooth devices that use encryption and authentication will utilize similar link keys to communicate. To provide the same link keys, either the same PIN code can be input by a user, or a mandatory, fixed PIN code (which is stored on the device and cannot be entered on the UI (user interface) level) could be used. Most Bluetooth devices, however, have different PIN codes, so that one of the devices should receive a PIN code from a user.

With Bluetooth devices such as display panels that do not comprise a user interface, however, it is very inconvenient to receive user data such as the PIN code from a user for purposes of authentication or encryption. On the user interface level, the user data comprises information such as a "Bluetooth Device Address" (BD_ADDR) (which is a unique address of the device that is used during a device discovery process), a PIN code (or Bluetooth Passkey), and a user-friendly name (or Bluetooth device name), which a user can input directly.

A Bluetooth device utilizes master parameters including BD_ADDR of a user and clock information for establishing a physical connection, as well as executing the steps of "Inquiry" and "Page" in order to exchange information. The "Inquiry" step discovers where the Bluetooth device is located and obtains the user's BD_ADDR. The "Page" step substantially makes connection between two devices. The user receives the BD_ADDR of the master through the "Page" step. Typically, the "Inquiry" process takes 15.24 seconds on average, which is a relatively long time.

SUMMARY OF THE INVENTION

It is an object of the present invention to provide a method to conveniently use user data in a Bluetooth device without a user interface.

It is another object of the present invention to provide a method of reducing the time loss for establishing connection by omitting an 'Inquiry'step for obtaining a user's BD_ADDR.

The present invention is directed to a method for using user data in a Bluetooth device without a user interface. In one aspect, a method of utilizing user data in a Bluetooth device comprises transmitting user data from a first Bluetooth device having a user interface to a second Bluetooth device having no user interface, and storing the user data in the second Bluetooth device, reading out the stored user data in response to an input of a predetermined shortcut key, and establishing communication with a Bluetooth device that corresponds to the read-out user data.

In another aspect, a method of utilizing user data in a Bluetooth device comprises transmitting user data from a first Bluetooth device having a user interface to a second Bluetooth device having no user interface and storing the user data in the second Bluetooth device, automatically reading out the stored user data by executing a predetermined software program in the second Bluetooth device, and establishing communication with a Bluetooth device that corresponds to the read-out user data.

In yet another aspect, the user data is stored in a flash memory.

In another aspect, the step of transmitting user data occurs automatically when the second Bluetooth device initially connects to the first Bluetooth device, or earlier before using the user data.

In yet another aspect, a method of utilizing user data in a Bluetooth device comprises transmitting user data from a first Bluetooth device having a user interface to a second Bluetooth device having no user interface and storing the user data in the second Bluetooth device, generating a link key using the received user data and storing the link key, reading out the stored link key in response to an input of a predetermined shortcut key, and establishing communication with a Bluetooth device that corresponds to the read-out link key.

In another aspect, a method of utilizing user data in a Bluetooth device comprises transmitting user data from a first Bluetooth device having a user interface to a second Bluetooth device having no user interface and storing the user data in the second Bluetooth device, generating a link key using the received user data and storing the link key, automatically reading out the stored link key by executing a predetermined software program in the second Bluetooth device, and establishing communication with a Bluetooth device that corresponds to the read-out link key.

In yet another aspect, the link keys are storing in a flash memory.

According to the present invention, a Bluetooth device without a user interface enable user data to be utilized more conveniently. Further, the 'Inquiry' step for obtaining a user's BD_ADDR may be omitted to reduce the time loss for connection. These and other aspect, features and advantages of the invention will be described and become apparent from the following detailed description of preferred embodiments, which is to be read in connection with the accompanying drawings.

DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those of ordinary skill in the art.

Figure 1:
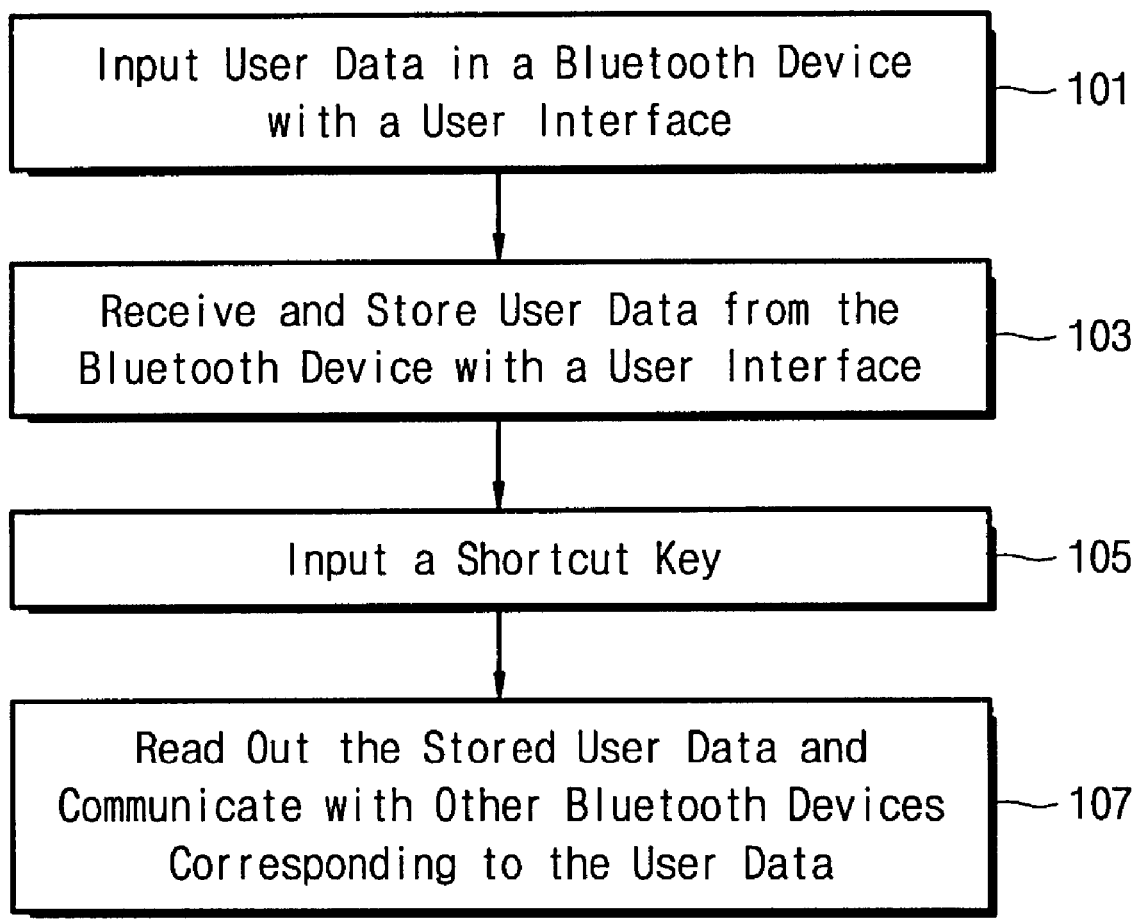
FIG. 1 is a flow diagram illustrating a method of utilizing user data in a Bluetooth device according to an embodiment of the present invention.

FIG. 1 is a flow diagram illustrating a method of utilizing user data in a Bluetooth device according to an embodiment of the present invention. Referring to FIG. 1, user data is input in a first Bluetooth device having a user interface (101). A second Bluetooth device having no user interface receives the user data from the first Bluetooth device and stores the data (103). The transmission of the user data from the first device to the second Bluetooth device (no UI) may be executed when either the second Bluetooth device (no UI) is initially connected with the first Bluetooth device having a user interface or prior to utilizing the user data. Next, when a pre-allocated shortcut key is inputted (105), the second Bluetooth device (with no UI) reads out the stored user data and uses the data for communication with a Bluetooth device that corresponds to the user data.

Figure 2:
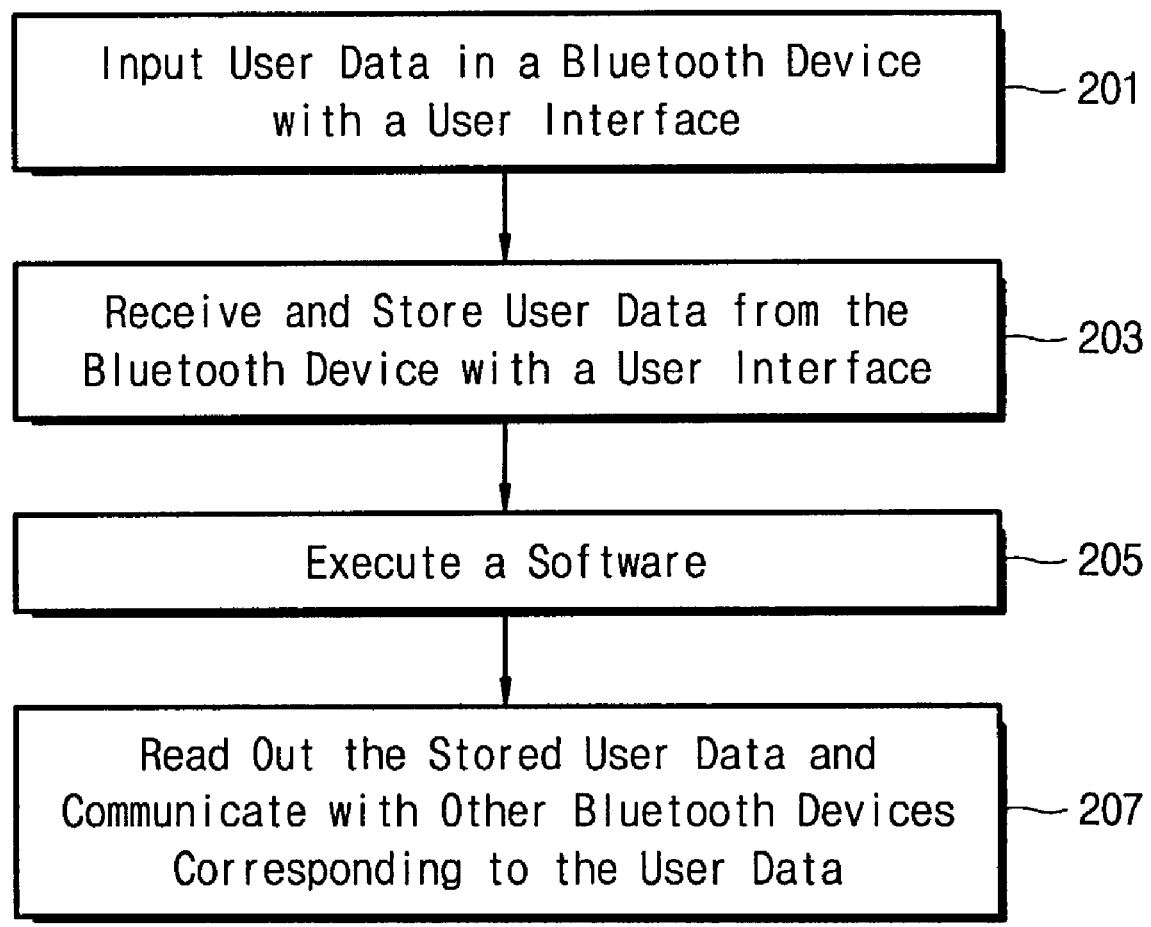
FIG. 2 is a flow diagram illustrating a method of utilizing user data in a Bluetooth device according to another embodiment of the present invention.

FIG. 2 is a flow diagram of a method of utilizing user data in a Bluetooth according to another embodiment of the present invention. The method of FIG. 2 is similar to the method of FIG. 1, except that with the method of FIG. 2, the stored user data is automatically read out, not by inputting a shortcut key, but by executing predetermined software program (205). All other steps are similar, that is, user data is input in the first Bluetooth device with the user interface (201), the user data is transmitted and to the second Bluetooth device (with no UI) and stored (203), and the stored user data are read out and used for communication (205).

Figure 3:
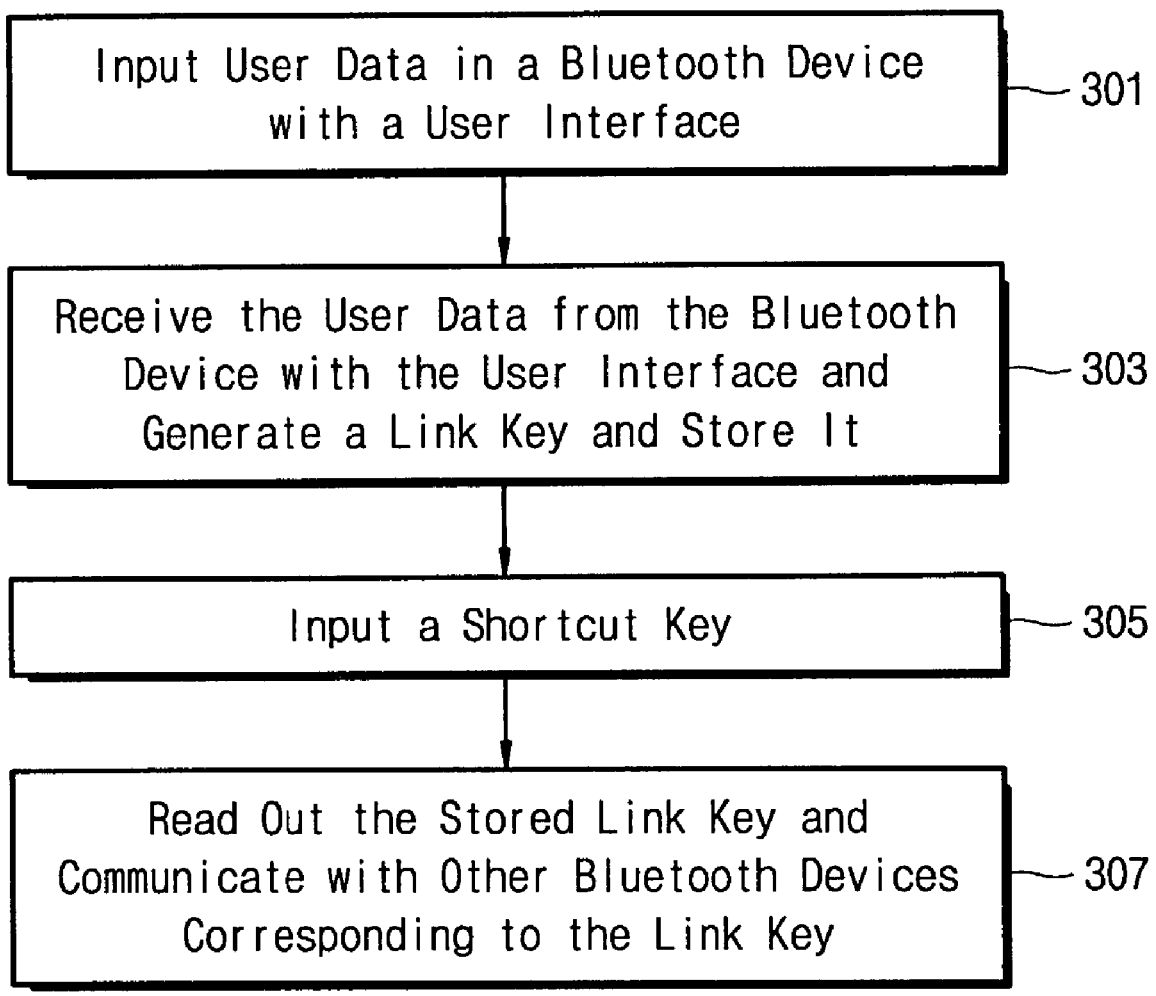
FIG. 3 is a flow diagram illustrating a method of utilizing user data in a Bluetooth device according to yet another embodiment of the present invention.

FIG. 3 is a flow diagram of a method for utilizing user data in a Bluetooth device according to yet another embodiment of the present invention. User data is input in a first Bluetooth device having a user interface (301). A second Bluetooth device having no user interface receives the user data from the first Bluetooth device and generates a link key from the user data and stores the link key (303). Next, when a pre-allocated shortcut key is inputted (305), the second Bluetooth device (with no UI) reads out the stored link key and uses the link key for communication with a Bluetooth device that corresponds to the link key (307).

Figure 4:
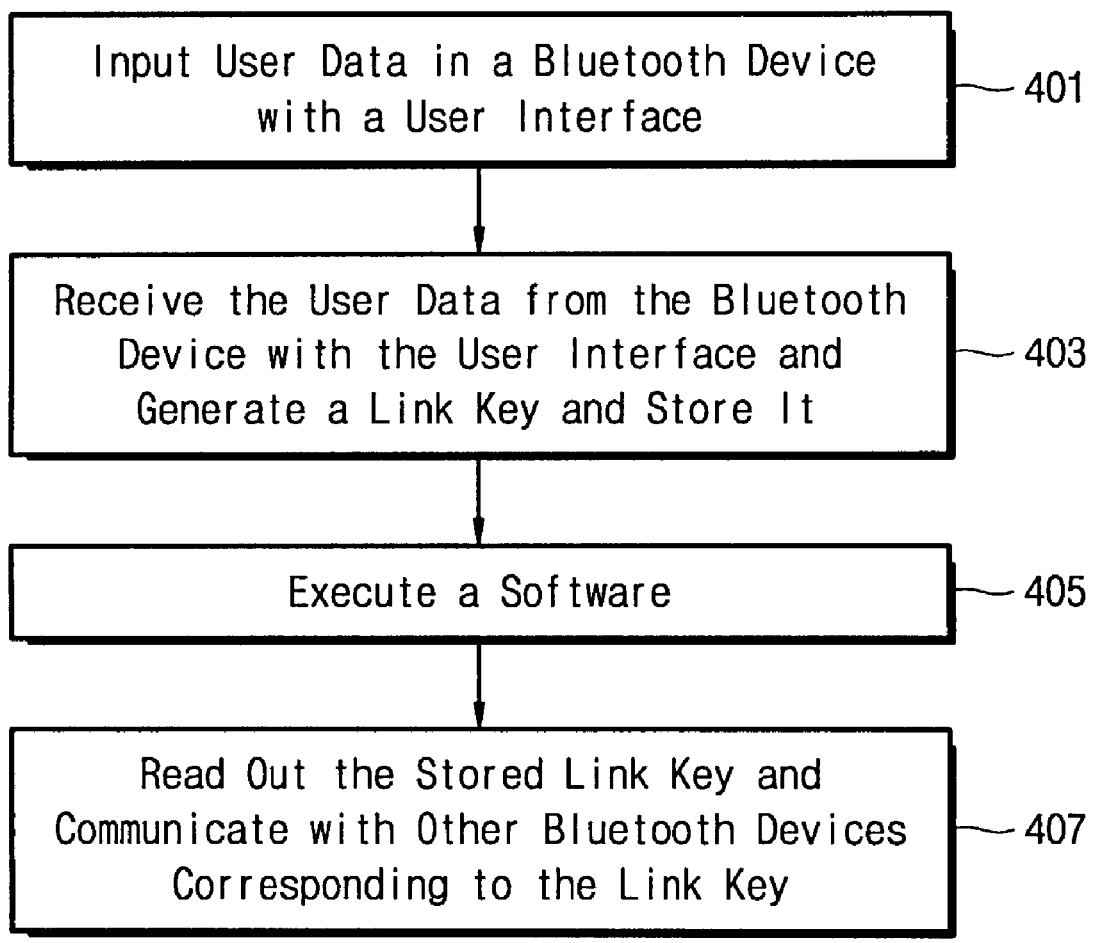
FIG. 4 is a flow diagram illustrating a method of utilizing user data in a Bluetooth device according to another embodiment of the present invention.

FIG. 4 is a flow diagram illustrating a method of utilizing user data in a Bluetooth device according to another embodiment of the present invention. The method of FIG. 4 is similar to the method of FIG. 3, except that the stored link keys are automatically read out, not by inputting shortcut key, but by executing a predetermined software program (405). The other steps (401, 403 and 407) are similar to those illustrated in FIG. 3.

Figure 5:
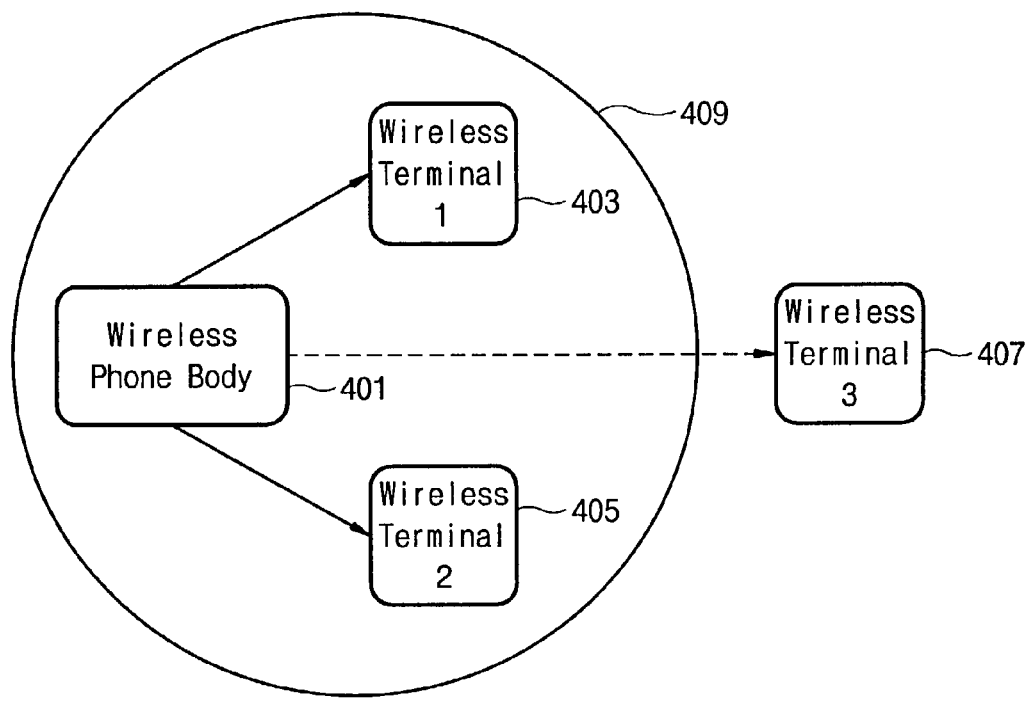
FIG. 5 is a diagram illustrating an exemplary application of the present invention for communication between a wireless terminal and the body of a wireless phone.

FIG. 5 is a diagram of an exemplary application of the present invention wherein a wireless terminal is used for connection with a body of a wireless phone. The system of FIG. 5, comprises a body of a wireless phone 401, first-third wireless terminals 403, 405 and 407, and a piconet 409.

In the exemplary embodiment, the first wireless terminal 403 utilizes data such as the BD_ADDR and PIN code which is stored in the body of the wireless phone 401 and in the second wireless terminal 405. When a new wireless terminal (i.e., the third wireless terminal 407) is initially connected with the wireless phone body 401, the first wireless terminal 403 will receive the user data of the third wireless terminal 407 from the wireless phone body 401 and then store such received data. The second wireless terminal 405 will use the data, such as the BD_ADDR and PIN code, which is already stored in the body of the wireless phone 401 and the first wireless terminal 403. When the third wireless terminal 407 is initially connected with the wireless phone body 401, the second wireless terminal 405 receives data of the third wireless terminal 407 from the wireless phone body 401 and stores the received data. On the other hand, the third wireless terminal 407 receives user data of the first and second wireless terminals 403 and 405 from the wireless phone body 401 and stores the received data. Then, the wireless terminals 403, 405 and 407 use the stored data and connect with each other for communication.

In general, the wireless phone is developed to use one body together with several wireless terminals. But, when using a wireless phone, after a user initially purchases the phone and sets a necessary setting, a connection should be continuously made so that the user does not have to input the data anymore. To realize this, the BD_ADDR of the body should be stored in the wireless terminal. Even when two wireless terminals are internally busy, the BD_ADDR of the terminals should be stored therein because no data may be transferred while executing the 'Inquiry' or 'Page' methods. This is especially true for systems such as wireless phones that require real time transfer of data, which can not execute the 'Inquiry' or 'Page' while transferring data. Thus, if a new terminal is required for connection on busy channel, a TDD switch method is used. But, even in this case, the BD_ADDR of the body should be stored in the wireless terminal. This is especially useful when the connection is disconnected and required for reconnection or for interphone communication between wireless terminals.

Figure 6:
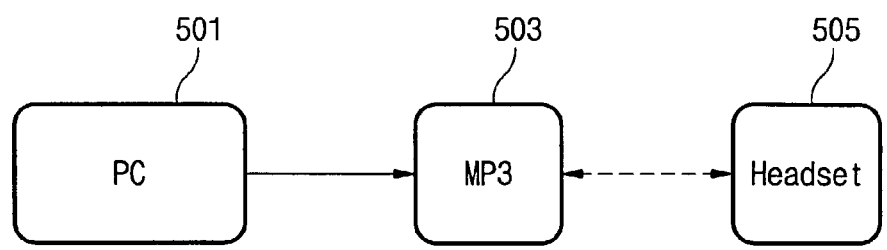
FIG. 6 is a diagram illustrating another exemplary application of the present invention for communication between a new headset and a body of an MP3 player.

FIG. 6 is an exemplary diagram illustrating an application of the present invention wherein a headset is used for connection with the body of an MP3 player. In FIG. 6, the system comprises a personal computer 501, an MP3 player 503, and a headset 505. The personal computer 501 executes a user interface program capable of inputting user data required for the MP3 player 503. The MP3 player 503 downloads an MP3 file together with user data such as BD_ADDR and PIN code, and stores them. The MP3 player 503 allocates a shortcut key for the downloaded user data. Alternatively, in case of the PIN code, the MP3 player does not store the PIN code and uses the PIN code as a variable PIN code in the state of being connected with the headset 505. The headset 505 uses the stored PIN code (which is stored as a mandatory PIN) to connect with other Bluetooth devices for communication.

When an MP3 file (song) is downloaded, if the BD_ADDR of the headset has been pre-stored in a flash memory of the MP3 player, a newly purchased headset may be connected with the MP3 player without any additional input of the user or simply by inputting a shortcut key. If not, whenever they are connected with each other, the MP3 player should execute the 'Inquiry' and 'Page' steps, or the user should manually input the BD_ADDR. The headset has no user interface, so that there is no method to input a PIN code therein. Thus, the headset may be sold with a mandatory fixed PIN code, which is stored therein. In this case, the MP3 player should receive the PIN code that is set forth in the manual supplied or associated with the particular headset. Likewise, if a PIN code of a newly purchased headset is pre-stored in the MP3 player when a song is downloaded from the personal computer into the MP3 player, or if the PIN code is inputted in the MP3 player when the MP3 player is initially connected with the headset, a link key is generated and stored in a flash memory. Thus, even though the connection is disconnected and reconnected, it is possible to communicate with the MP3 player and headset by using and authentication and encryption process without a new input.

In summary, the present invention advantageously allows a Bluetooth device without a user interface to utilize user data more conveniently. Also, the 'Inquiry' step for obtaining the BD_ADDR of the user may be omitted to reduce the associated time loss when establishing a connection.

Although illustrative embodiments have been described herein with reference to the accompanying drawings, it is to be understood that the present invention is not limited to those precise embodiments, and that various other changes and modifications may be affected therein by one skilled in the art without departing from the scope and spirit of the invention. It is to be understood that all such changes and modifications are intended to be included within the scope of the invention as defined by the appended claims.

What is claimed is:

1. A method of utilizing user data in a Bluetooth device, comprising the steps of:
    transmitting user data from a first Bluetooth device having a user interface to a second Bluetooth device having no user interface, and storing the user data in the second Bluetooth device, wherein the user data comprises a fixed device address, a personal identification number (PIN), or a user friendly name, or any combination thereof;
    the second Bluetooth device reading out the stored user data in response to an input of a predetermined shortcut key; and
    the second Bluetooth device establishing direct communication with a third Bluetooth device that corresponds to the read-out user data, without using the first Bluetooth device as an intermediary.

2. The method of claim 1, wherein the step of storing the user data comprises storing the user data in a flash memory.

3. The method of claim 1, wherein the step of transmitting user data occurs automatically when the second Bluetooth device initially connects to the first Bluetooth device.

4. A method of utilizing user data in a Bluetooth device, comprising the steps of:
    transmitting user data from a first Bluetooth device having a user interface to a second Bluetooth device having no user interface and storing the user data in the second Bluetooth device, wherein the user data comprises a fixed device address, a personal identification number (PIN), or a user friendly name, or any combination thereof;
    the second Bluetooth device automatically reading out the stored user data by executing a predetermined software program in the second Bluetooth device; and
    the second Bluetooth device establishing direct communication with a third Bluetooth device that corresponds to the read-out user data, without using the first Bluetooth device as an intermediary.

5. The method of claim 4, wherein the step of storing the user data comprises storing the user data in a flash memory.

6. The method of claim 4, wherein the step of transmitting user data occurs automatically when the second Bluetooth device initially connects to the first Bluetooth device.

7. A method of utilizing user data in a Bluetooth device, comprising the steps of:
    transmitting user data from a first Bluetooth device having a user interface to a second Bluetooth device having no user interface and storing the user data in the second Bluetooth device, wherein the user data comprises a fixed device address, a personal identification number (PIN), or a user friendly name, or any combination thereof;
    the second Bluetooth device generating a link key using the received user data and storing the link key;
    the second Bluetooth device reading out the stored link key in response to an input of a predetermined shortcut key; and
    the second Bluetooth device establishing direct communication with a third Bluetooth device that corresponds to the read-out link key, without using the first Bluetooth device as an intermediary.

8. The method of claim 7, wherein the step of storing the link key comprises storing the link key in a flash memory.

9. The method of claim 7, wherein the step of transmitting user data occurs automatically when the second Bluetooth device initially connects to the first Bluetooth device.

10. A method of utilizing user data in a Bluetooth device, comprising the steps of:
    transmitting user data from a first Bluetooth device having a user interface to a second Bluetooth device having no user interface and storing the user data in the second Bluetooth device, wherein the user data comprises a fixed device address, a personal identification number (PIN), or a user friendly name, or any combination thereof;
    the second Bluetooth device generating a link key using the received user data and storing the link key;
    the second Bluetooth device automatically reading out the stored link key by executing a predetermined software program in the second Bluetooth device; and
    the second Bluetooth device establishing direct communication with a third Bluetooth device that corresponds to the read-out link key, without using the first Bluetooth device as an intermediary.

11. The method of claim 10, wherein the step of storing the link key comprises storing the link key in a flash memory.

12. The method of claim 10, wherein the step of transmitting user data occurs automatically when the second Bluetooth device initially connects to the first Bluetooth device.

* * * * *